(12) United States Patent
Shimizutani et al.

(10) Patent No.: US 9,612,120 B2
(45) Date of Patent: Apr. 4, 2017

(54) ROUTE PLANNING APPARATUS AND ROUTE PLAN VERIFYING METHOD

(71) Applicant: Furuno Electric Co., Ltd., Nishinomiya (JP)

(72) Inventors: Ryu Shimizutani, Nishinomiya (JP); Masato Okuda, Kyoto (JP); Masami Tagawa, Takasago (JP); Tomihiko Oda, Nishinomiya (JP); Takatoshi Morita, Nishinomiya (JP)

(73) Assignee: Furuno Electric Co., Ltd., Nishinomiya (JP)

( * ) Notice: Subject to any disclaimer, the term of this patent is extended or adjusted under 35 U.S.C. 154(b) by 0 days.

(21) Appl. No.: 13/861,263

(22) Filed: Apr. 11, 2013

(65) Prior Publication Data
US 2013/0275046 A1    Oct. 17, 2013

(30) Foreign Application Priority Data
Apr. 11, 2012  (JP) .................. 2012-090563

(51) Int. Cl.
*G01C 21/34* (2006.01)
*G08G 1/123* (2006.01)
*G01C 21/20* (2006.01)
*G01C 21/00* (2006.01)

(52) U.S. Cl.
CPC ......... *G01C 21/203* (2013.01); *G01C 21/005* (2013.01); *G01C 21/20* (2013.01)

(58) Field of Classification Search
CPC ....... G01C 21/05; G01C 21/20; G01C 21/203
USPC .................................................. 701/533, 21
See application file for complete search history.

(56) References Cited

U.S. PATENT DOCUMENTS

| | | | |
|---|---|---|---|
| 6,199,008 B1 * | 3/2001 | Aratow et al. ................ 701/120 |
| 6,381,538 B1 * | 4/2002 | Robinson et al. ............ 701/439 |
| 6,865,476 B1 * | 3/2005 | Jokerst, Sr. ................... 701/467 |
| 7,268,703 B1 * | 9/2007 | Kabel .................. G01C 21/203 |
| | | | 340/984 |
| 7,437,241 B2 * | 10/2008 | Jung et al. .................... 701/533 |
| 7,774,133 B2 * | 8/2010 | Schwarzmann ............. 701/467 |
| 7,860,646 B2 * | 12/2010 | Bruce et al. .................. 701/423 |
| 7,949,465 B2 * | 5/2011 | Bruce et al. .................. 701/415 |

(Continued)

FOREIGN PATENT DOCUMENTS

| | | |
|---|---|---|
| CN | 1746628 A | 3/2006 |
| GB | 2474715 A | 4/2011 |

(Continued)

*Primary Examiner* — Yonel Beaulieu
*Assistant Examiner* — Lail Kleinman
(74) *Attorney, Agent, or Firm* — Alleman Hall McCoy Russell & Tuttle LLP

(57) ABSTRACT

A route planning apparatus is provided. The apparatus may include a display, a user interface, a caution information reader, and a route verifier. The display displays a user-scheduled route on a map. The user interface accepts an input of time and date to travel on the route. The caution information reader reads caution information having influence on the travel and associated with position, and time and date. The route verifier verifies whether the travel on the route is available based on one or more positions, and times and dates at which the caution information read by the caution information reader indicates, one or more positions on the route, and the inputted travel time and date.

16 Claims, 8 Drawing Sheets

(56) References Cited

U.S. PATENT DOCUMENTS

| | | | |
|---|---|---|---|
| 8,155,811 B2* | 4/2012 | Noffsinger et al. | 701/21 |
| 8,180,507 B2* | 5/2012 | Dokken | 701/21 |
| 8,296,001 B1* | 10/2012 | Kabel et al. | 701/21 |
| 8,594,866 B1* | 11/2013 | Chen et al. | 701/21 |
| 8,634,975 B2* | 1/2014 | Chen et al. | 701/21 |
| 2008/0033644 A1* | 2/2008 | Bannon | G01C 21/3461 701/414 |
| 2008/0133131 A1* | 6/2008 | Poreda et al. | 701/210 |
| 2008/0180282 A1* | 7/2008 | Brosius | 340/995.27 |
| 2009/0207020 A1* | 8/2009 | Garnier et al. | 340/541 |
| 2010/0280750 A1* | 11/2010 | Chen et al. | 701/204 |

FOREIGN PATENT DOCUMENTS

| | | | |
|---|---|---|---|
| JP | H07248727 A | 9/1995 |
| JP | S63018411 A | 1/1998 |
| JP | 2002090171 A | 3/2002 |
| JP | 2005162117 A | 6/2005 |
| JP | 2010012947 A | 1/2010 |
| JP | 2010139515 A | 6/2010 |

* cited by examiner

| CAUTION INFORMATION | | | |
|---|---|---|---|
| CONTENTS | RELEVANT RANGE | RELEVANT PERIOD | CAUTION LEVEL |
| TRAVEL PROHIBITED AREA | ----- | ANYTIME | TRAVEL PROHIBITED |
| YACHT RACE | ----- | YYYYMM~YYYYMM | TRAVEL PROHIBITED |
| NO-FISHING ZONE | ----- | YYYYMM~YYYYMM | TRAVEL CAUTION |
| SHALLOW WATER | ----- | YYYYMM~YYYYMM | TRAVEL CAUTION |

FIG. 2

ROUTE PLANNING APPARATUS AND ROUTE PLAN VERIFYING METHOD

CROSS-REFERENCE TO RELATED APPLICATION(S)

The application claims priority under 35 U.S.C. §119 to Japanese Patent Application No. 2012-090563, which was filed on Apr. 11, 2012, the entire disclosure of which is hereby incorporated by reference.

TECHNICAL FIELD

The present invention generally relates to a route planning apparatus that can create and display a route.

BACKGROUND OF THE INVENTION

Conventionally, navigation devices have been known, which are equipped in movable bodies (e.g., automobiles, ships, airplanes) and create a route by being inputted with a departure location and a destination from a user. For example, the navigation devices equipped in automobiles are stored with maps, and based on these maps, it creates various kinds of routes according to a required time for travel and highway tolls, etc. JP2010-139515A discloses such kind of navigation device.

The navigation device in JP2010-139515A is stored with a map, and additionally, traffic congestion situation of each road for each time and date. When the user specifies a departure location and a destination, and the navigation device receives an instruction to create a route from the departure location to the destination, the navigation device calculates a required time for travel according to the traffic congestion situation, and displays it together with the route.

Moreover, the navigation device in JP2010-139515A is configured to accept time and date specification when creating the route. When the user specifies the time and date, the navigation device displays a required time for travel (and traffic congestion situation) on the route for the specified time and date.

However, in fact, there is a case where the road on the route is not passable because the road is under construction or too narrow for the size of the automobile (e.g., large-sized vehicle) equipped with the navigation device to pass, or the entry into the road is simply prohibited depending on the season. Particularly, in a case of performing navigation, many locations are not passable, such as, travel prohibited area, shallow water, frozen water, and yacht race venue, and also it is not rare that the unpassable locations change according to the time and season. In this regard, JP2010-139515A does not disclose about considering other aspects than the traffic congestion situation of the road.

Moreover, depending on the movable body and the traveling purpose, it is desired to move along the route scheduled by the user, and not the route proposed by the navigation device (e.g., when it is desired to perform navigation to efficiently bypass a plurality of fish reefs). In other words, it has been desired to provide a device for verifying whether a route scheduled by a user can be traveled, and not for creating a route by itself.

SUMMARY OF THE INVENTION

The present invention is made in view of the above situation, and it provides a route planning apparatus that can verify whether a route scheduled by a user can be traveled at a specified time and date.

According to an aspect of the invention, a route planning apparatus is provided. The apparatus includes a display, a user interface, a caution information reader, and a route verifier. The display displays a user-scheduled route on a map. The user interface accepts an input of time and date to travel on the route. The caution information reader reads caution information having influence on the travel and associated with position, and time and date. The route verifier verifies whether the travel on the route is available based on one or more positions, and times and dates at which the caution information read by the caution information reader indicates, one or more positions on the route, and the inputted travel time and date.

In this manner, the user can grasp the details of the caution information existing on (or near) the route on the inputted time and date among all the caution information existing on the map. Therefore, a new route to travel can easily be planed, for example. Additionally, even when it is confirmed that the scheduled route cannot be traveled, the route or the travel time and date can easily be changed with the configuration described above, and therefore, it can easily be learned whether the travel is available on the route or the travel time and date after being changed, even before actually changing the travel time and date.

The caution information reader may read the caution information having influence on the travel, based on the travel time and date inputted through the user interface, the caution information being associated with position, and time and date. The verifier may verify whether the travel on the route is available on the travel time and date based on at least the caution information on or near the one or more positions on the route among the caution information read by the caution information reader.

In this manner, the user can grasp the details of the caution information on the route (or near the route) at the inputted time and date. Therefore, for example, a future route can easily be planned. Additionally, even when it is confirmed that the created route cannot be traveled, because the above configuration can easily change the travel time and date, it can easily be learned whether the route after the change of the travel time and date can be traveled even before actually changing the travel time and date.

The caution information may contain information on at least one of a no-fishing zone and a travel prohibited area.

In this manner, the user can learn that the set route cannot be traveled (or is unavailable for fishing).

The user interface may accept inputs of a travel starting time and date and a travel ending time and date on the route.

In this manner, even when travelling for a long period of time, the user can grasp caution information that corresponds to the schedule of the long time period travel to some level.

The user interface may accept an input of a travel time and date for at least a partial range of the route formed by dividing the route.

In this manner, even when travelling for a long period of time, the user can grasp caution information that corresponds to the schedule of the long time period travel to high level.

The route verifier may verify that the travel along the route is not available when the caution information contains information on a travel prohibited area and the route includes a position at which the information on the travel prohibited area indicates.

In this manner, the user can easily learn whether the created route can be traveled at the inputted travel time and date.

The route planning apparatus may include a memory for either one of storing the caution information and reading a memory medium that is stored with the caution information. The caution information reader may read the caution information from the memory.

In this manner, the caution information can be used even in an environment with no connection with internet. Therefore, the caution information can be safely used without circuit disturbance, etc.

The caution information reader may read the caution information via internet.

In this manner, latest caution information can easily be acquired.

The display may display a verification result on the route that is outputted from the route verifier.

In this manner, the user can easily grasp the verification result on the route.

The display may display the route by changing a displaying form of the route according to the verification result.

In this manner, the user can grasp the verification result on the route more easily. Particularly, when not only two kinds of navigable/unnavigable, but more kinds exist for the verification result, the verification result can be grasped by glancing.

The route may be formed by connecting a plurality of waypoints with each other that are specified by the user.

In this manner, the user can instinctively create the route. Additionally, when the route is determined as unnavigable and is recreated, the user is only required to move a predetermined waypoint (the user doesn't have to create the route from the start). Thus, a new route can easily be created.

The user interface may accept the input of the travel time and date for each of the waypoints.

In this manner, since the waypoint may be set to the position desired to pass, by inputting time and date that the user wants to pass the position, the travel time and date can be inputted in a method suitable for the using form by the user.

The route planning apparatus may be equipped in a ship.

In this manner, effects of the route planning apparatus in this aspect of the invention which is installed in the ship can be exerted.

According to another aspect of the present invention, a method of planning and verifying a route is provided. The method includes creating a route according to an instruction from a user, setting time and date to travel on the route according to an instruction from the user, and reading caution information having influence on the travel and associated with position, and time and date. The method also includes verifying whether the travel on the route is available based on one or more positions, and times and dates at which the read caution information indicates, one or more positions on the route, and the set travel time and date.

In this manner, the user can grasp the details of the caution information existing on (or near) the route on the inputted time and date among all the caution information existing on the map. Therefore, a new route to travel can easily be planed, for example. Additionally, even when it is confirmed that the scheduled route cannot be traveled, the route or the travel time and date can easily be changed with the configuration described above, and therefore, it can easily be learned whether the travel is available on the route or the travel time and date after being changed, even before actually changing the travel time and date.

The reading caution information may include reading the caution information having influence on the travel, based on the set travel time and date, the caution information being associated with position, and time and date. The verifying whether the travel on the route is available may include verifying whether the travel on the route is available on the travel time and date based on at least the caution information on or near the one or more positions on the route among the read caution information. In this manner, the user can grasp the details of the caution information on the route (or near the route) at the inputted time and date. Therefore, for example, a future route can easily be planned. Additionally, even when it is confirmed that the created route cannot be traveled, because the above configuration can easily change the travel time and date, it can easily be learned whether the route after the change of the travel time and date can be traveled even before actually changing the travel time and date.

BRIEF DESCRIPTION OF THE DRAWINGS

The present disclosure is illustrated by way of example and not by way of limitation in the figures of the accompanying drawings, in which the like reference numeral indicate like elements and in which:

FIG. 2 is a table showing contents of a caution information list;

DETAILED DESCRIPTION

Figure 1:
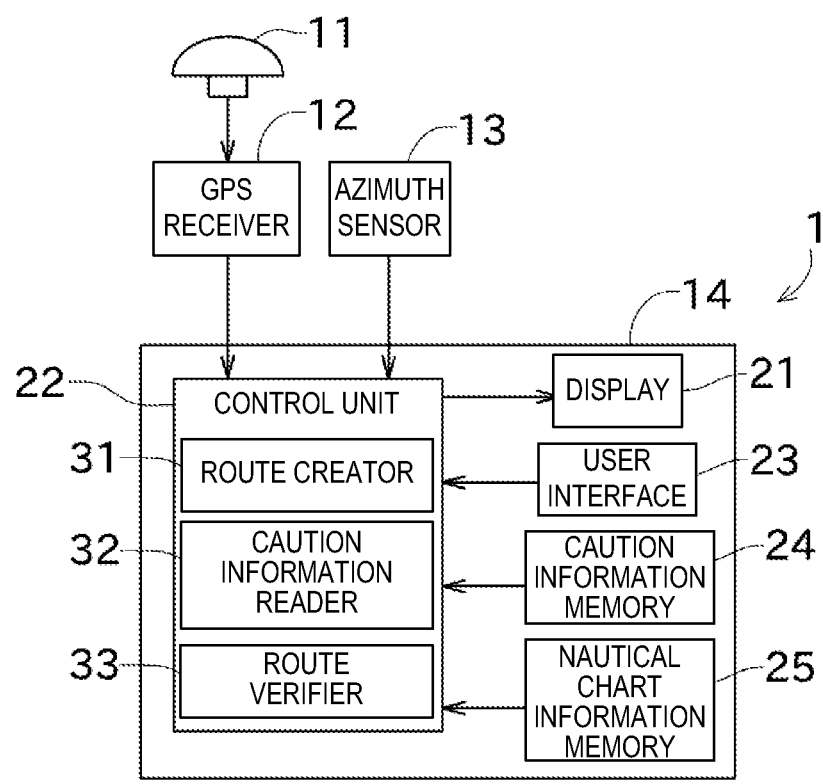
FIG. 1 is a block diagram showing an overall configuration of a navigation apparatus according to one embodiment of the invention.

Next, one embodiment of the present invention is described with reference to the appended drawings. FIG. 1 is a block diagram showing an overall configuration of a navigation apparatus 1. FIG. 2 is a table showing contents of a caution information list.

The navigation apparatus 1 is equipped in a ship, and can display a position of the ship on a nautical chart and create a route by an operation of a user. The navigation apparatus 1 can instruct an automatic steering device (not illustrated) to steer along the route. Thereby, the ship can travel along the route scheduled by the user. Hereinafter, the configuration of the navigation apparatus 1 is described.

As shown in FIG. 1, the navigation apparatus 1 includes a GPS receiver 12, an azimuth sensor 13, and an instruction device 14. The instruction device 14 includes a display 21, a control unit 22, a user interface 23, a caution information memory 24 (memory), and a nautical chart information memory 25.

The GPS receiver 12 receives positioning signals from an GPS antenna 11 and detects current positional information of the position of the ship. The positional information calculated by the GPS receiver 12 is outputted to the control unit 22 of the instruction device 14.

The azimuth sensor 13 has a plurality of GPS antennas fixed to the ship, and can detect a heading based on a relative positional relation of the GPS antennas. The heading calculated by the azimuth sensor 13 is transmitted to the control unit 22 of the instruction device 14. Note that, other than this configuration, for example, a magnetic azimuth sensor or a gyrocompass can be used as the azimuth sensor 13.

The display 21 can display various kinds of images created by the navigation apparatus 1. For example, the display 21 can display images of the ship position and the route on the nautical chart.

The control unit 22 is configured with hardware constituted with a CPU or other processor, volatile memory such as random access memory (RAM) and non-volatile memory such as Read Only Memory (ROM) (not illustrated), and software constituted with various programs stored in the ROM. The control unit 22 can perform a control (e.g., display control) of the instruction device 14 by executing the programs. Note that, the programs may be stored in a memory media (e.g., CD-ROM or memory card) alternative to the configuration of being stored in the ROM provided to the control unit 22.

The user interface 23 is, for example, keys (keyboard) controlled by the user. The user can create the route or change a display setting by controlling the user interface 23 to input an instruction. Note that, the user interface 23 is not limited to physical keys, such as arrow keys or a rotational key, but may be a touch panel. Alternatively, it may be a mouse (pointing device) or a trackball for moving a pointer on a display screen, for example.

The caution information memory 24 is, for example, a hard disk drive, and is stored with caution information having influence on the travel and associated with position, and time and date (see FIG. 2). The caution information list stored in the caution information memory 24 includes items of contents, a relevant range, a relevant period, and a caution level.

The "CONTENTS" indicate a kind of caution information. For example, the "TRAVEL PROHIBITED AREA" is an area where traveling is prohibited by law, etc. The "RELEVANT RANGE" indicates a range where the "CONTENTS" in the same row is applied. The relevant range is described by latitude and longitude specified in its range. The "RELEVANT PERIOD" indicates a period for which the "CONTENTS" in the same row is applied. The describing method of the relevant period is arbitrary, for example, it may be described by time, or as "ANYTIME." The "LEVEL" indicates a level of influence on the travel. In this embodiment, two levels are set: "TRAVEL PROHIBITED" and "TRAVEL CAUTION." The "TRAVEL PROHIBITED" indicates a state where passing the relevant location (area, section, etc.) itself is prohibited. The "TRAVEL CAUTION" indicates a state where the passing itself is not prohibited, but for example, fishing in the relevant location (area, section, etc.) is prohibited or caution for grounding is issued therein.

The nautical chart information memory 25 is, for example, a hard disk drive, and is stored with an electronic nautical chart. Note that, alternative to the hard disk drive, it may be constituted with a memory media (e.g., DVD or memory card) and a device for reading information from the memory media.

The navigation apparatus 1 is configured as above. With this configuration, the control unit 22 of the instruction device 14 can automatically display the nautical chart for around the ship on the display, based on the ship positional information inputted from the GPS receiver 12 and the stored contents in the nautical chart information memory 25.

Figure 3A:
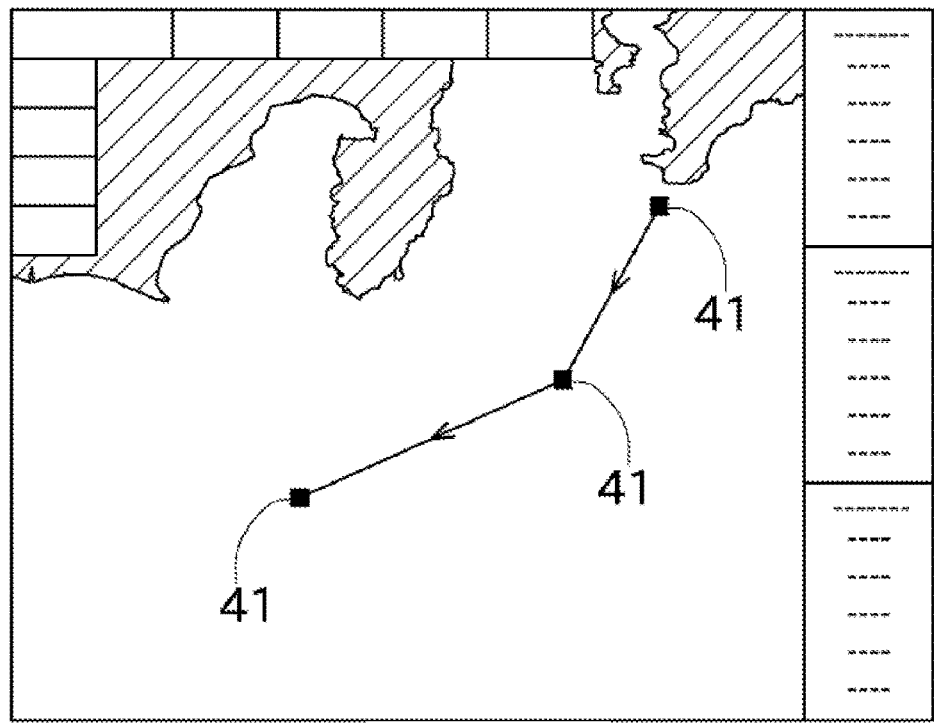
FIGS. 3A and 3B are views showing display screens when a route is created.
Figure 3B:
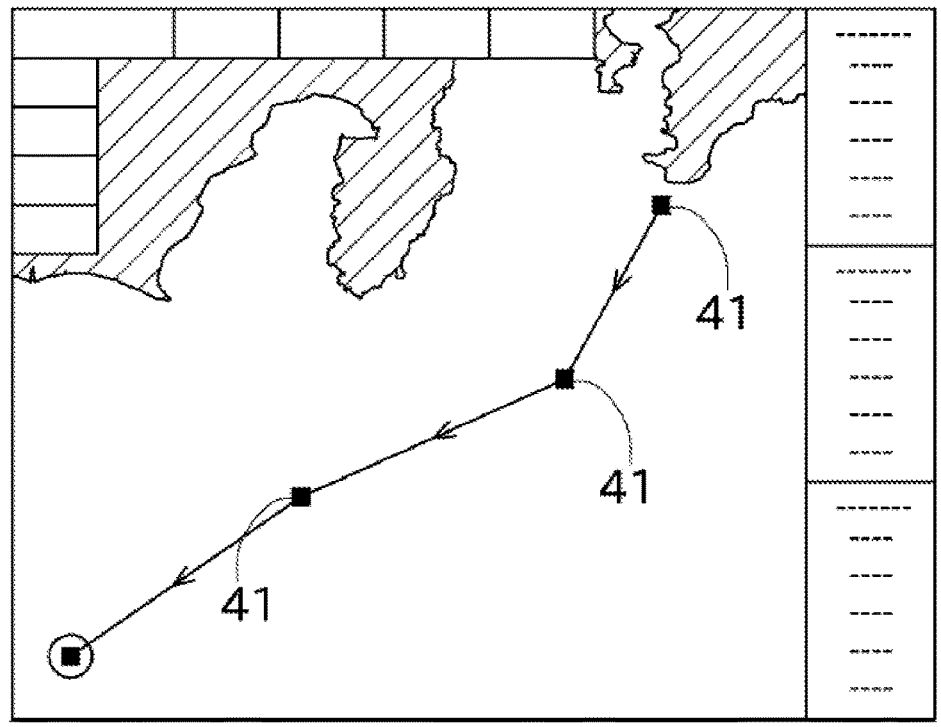

Hereinafter, a flow of creating a route by following an instruction from the user, and a flow of verifying the created route are described. FIGS. 3A and 3B are views showing display screens when the route is created. FIGS. 4A to 6B are views showing display screens when the route is verified. Note that, in each display screen, the area indicated by the diagonal lines is land, and other area indicates the sea.

Moreover, the control unit 22 includes a route creator 31, a caution information reader 32, and a route verifier 33. The route creator 31 creates the route based on inputs (inputs of positions) by the user. The caution information reader 32 accesses the caution information memory 24 and, based on each inputted position of the route scheduled by the user, reads the caution information corresponding to the position concerned. The route verifier 33 verifies the route based on the caution information which is read by the caution information reader 32.

When creating the route, the user controls the user interface 23 to activate a route creating mode, and the user specifies points (positions) on the nautical chart by clicking or touching. Thus, as shown in FIG. 3A, the specified points are connected with each other by a line. Additionally, the user specifies a destination of the route, and then determines the route to complete the route creation.

Here, the points specified by the user are referred to as waypoints 41. The waypoint 41 specified lastly has a mark surrounding it in circle. The mark indicates the destination of the route. Note that, a displaying form of the mark during the route creation is arbitrary, and the departure location can also have a mark. Additionally, for the kind of route, other than the route in which the departure location and the destination are specified, an endless route can also be created.

Figure 4A:
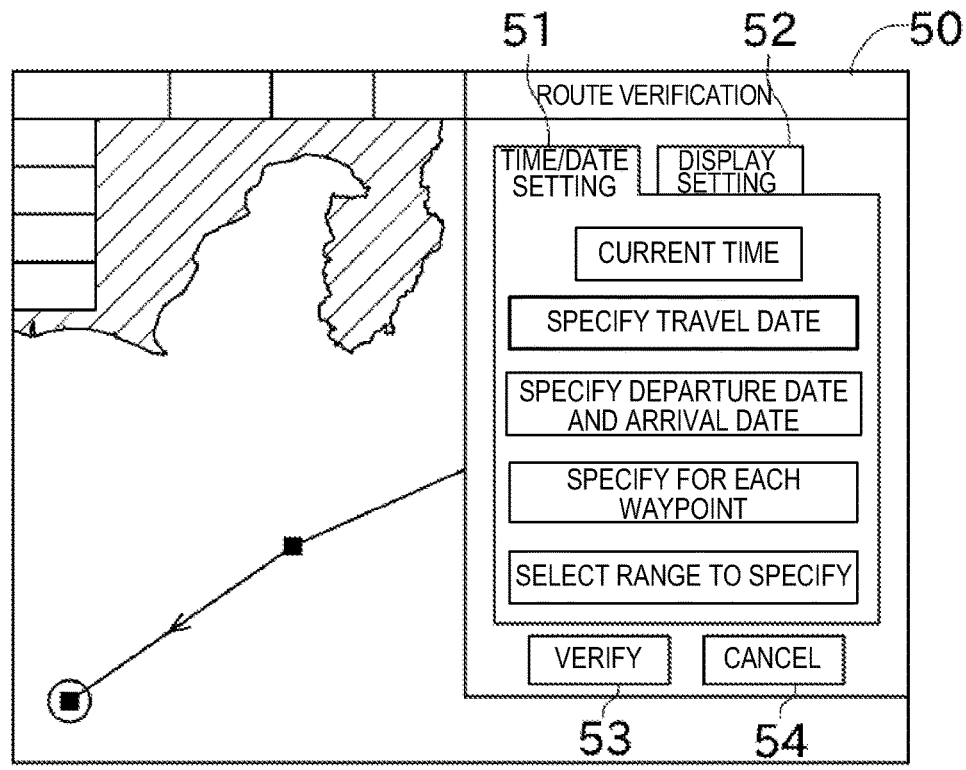
FIGS. 4A and 4B are views showing display screens when a time and date for performing a verification of the route is specified.
Figure 4B:
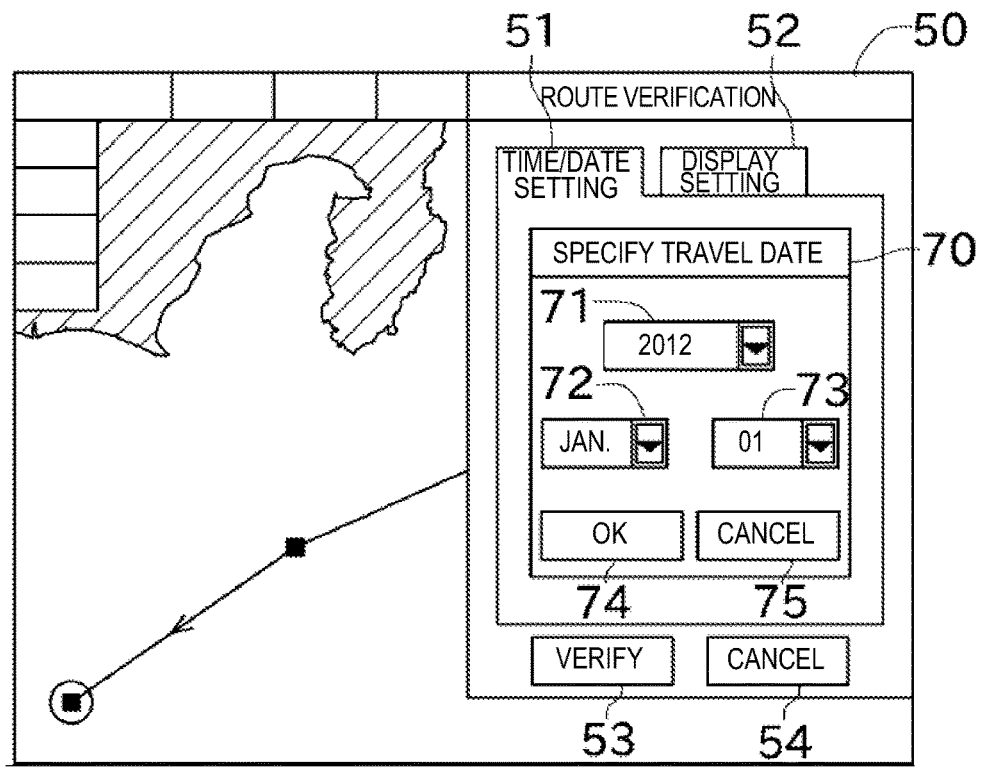

After the user completes the route creation, he/she controls the user interface 23 to display a route verifying box 50 shown in FIG. 4A, etc. As shown in FIG. 4A, the route verifying box 50 is displayed with a time and date setting tab 51, a display setting tab 52, a verifying key 53, and a cancellation key 54.

The time and date setting tab 51 specifies time and date to travel the route. The display setting tab 52 changes the display setting when verifying the route. The verifying key 53 starts the route verification. The cancellation key 54 ends the mode for verifying the route.

In this embodiment, there are five kinds of methods of specifying the time and date to travel on the route. Therefore, five keys are displayed within the time and date setting tab 51. Hereinafter, each key is described in order.

The "CURRENT TIME" is a specifying method in which current year, month, day and time (time and date) is set to be the travel time and date. The "SPECIFY TRAVEL DATE" is a specifying method in which a (one) predetermined time and date is specified and the specified time and date is set to be the travel time and date. The "SPECIFY DEPARTURE DATE AND ARRIVAL DATE" is a specifying method in which the time and date of departure (travel starting date) and the time and date of arrival (travel ending date) of the travel are specified. The "SPECIFY FOR EACH WAYPOINT" is a specifying method in which the time and date is specified for each waypoint 41. The "SELECT RANGE TO SPECIFY" is a specifying method in which the route is arbitrarily divided and the time and date is specified for each divided range.

In this embodiment, the "SPECIFY TRAVEL DATE" is described in detail. When the user selects (touches or clicks)

the "SPECIFY TRAVEL DATE" item, a travel date specifying box 70 is displayed within the route verifying box 50. The travel date specifying box 70 is displayed with a year specifying section 71, a month specifying section 72, a day specifying section 73, a time and date determining key 74, and a cancellation key 75.

The year specifying section 71, the month specifying section 72, and the day specifying section 73 are pull-down boxes, and year, month, and day can be specified therewithin. After year, month, and day are specified, by selecting (touching or clicking) the time and date determining key 74, the travel time and date can be specified. Alternatively, by selecting (touching, clicking) the cancellation key 75, the mode can return to selecting the specifying method for the travel time and date on the route.

Note that, in the specifying methods other than "SPECIFY TRAVEL DATE", processing of specifying a waypoint or a predetermined range, and specifying year, month, and day similarly to the above described method is performed. By repeating the processing, the travel time and date can be set, for example, for each waypoint or selected range. Moreover, when the specification is performed in any of these methods, the time and date between two specified points are automatically compensated. For example, when dates of adjacent waypoints are set to March 2, and March 4, within the predetermined range between the adjacent waypoints, the date is automatically set to March 3.

Figure 5A:
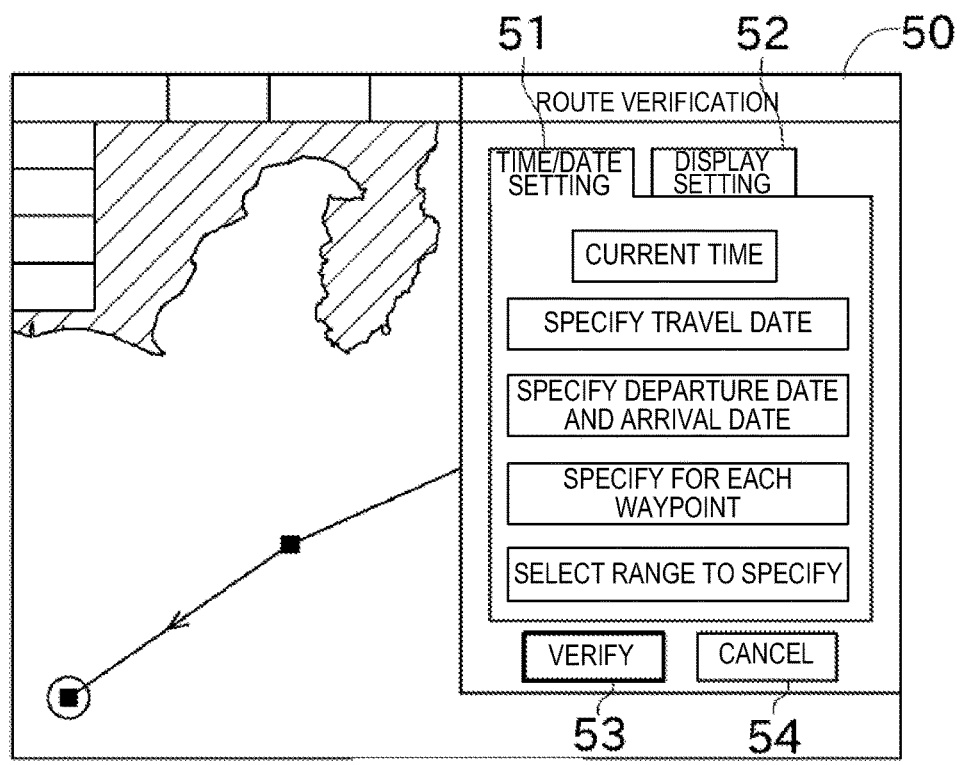
FIGS. 5A and 5B are views showing display screens when the verification of the route is performed.

After the user specifies the travel time and date as described above, he/she selects (touches, clicks) the verifying key 53 (see FIG. 5A). In this manner, the verification of the route scheduled by the user is performed.

The verification is performed in the control unit 22 as follows. Specifically, firstly, the caution information reader 32 accesses the caution information memory 24 and reads the caution information corresponding to the travel time and date on the route specified by the user. Next, the route verifier 33 verifies whether useful caution information exists for the position on the route create by the user and the specified travel time and date. Note that, in this verification, it may be configured so that only the caution information for the positions on the route (overlapping with the route) is extracted, that the caution information for near the route is additionally extracted, or that only the caution information near the route is extracted.

Figure 5B:
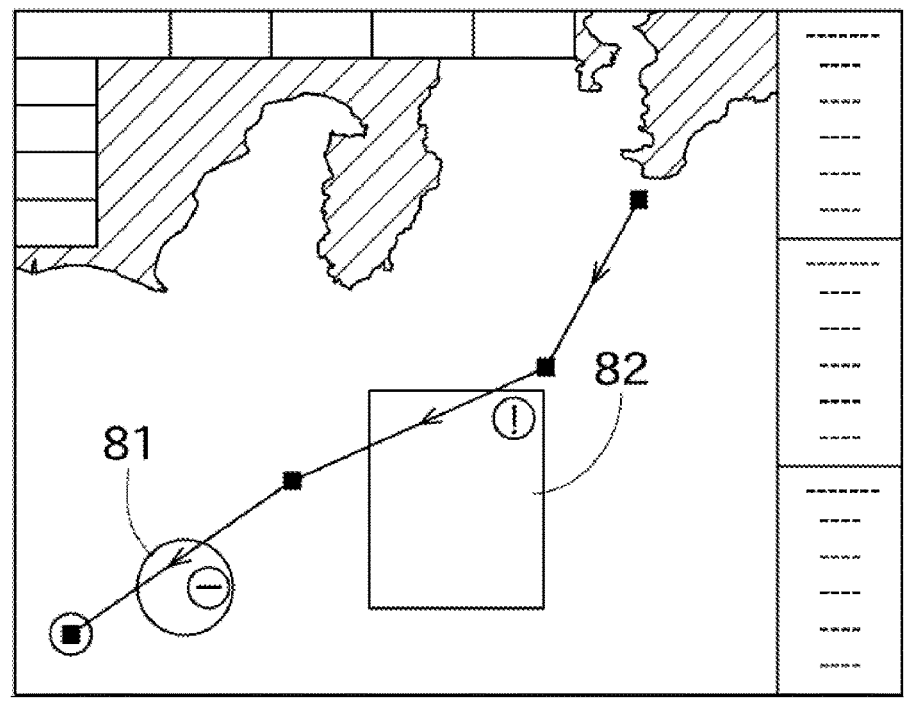

As a result of this verification, when relevant caution information exists, the route verifier 33 displays the relevant caution information on the display 21 (see FIG. 5B). The caution information is displayed on the nautical chart within a range which the caution information indicates (a prohibited area 81 and a caution area 82 in FIG. 5B). Additionally, in this embodiment, the mark displayed together with the range is varied according to the contents in "LEVEL" in the caution information list.

Note that, a displaying form of the verification result from the route verifier 33 is arbitrary and can suitably be changed. For example, when the caution information in which the level is "TRAVEL PROHIBITED" is overlapped with the route (when the route cannot be traveled), this situation may be informed by displaying it in a large size. Additionally or alternatively, only the line of the part of the route overlapping with the caution information may be displayed thicker (or in a different color).

Figure 6A:
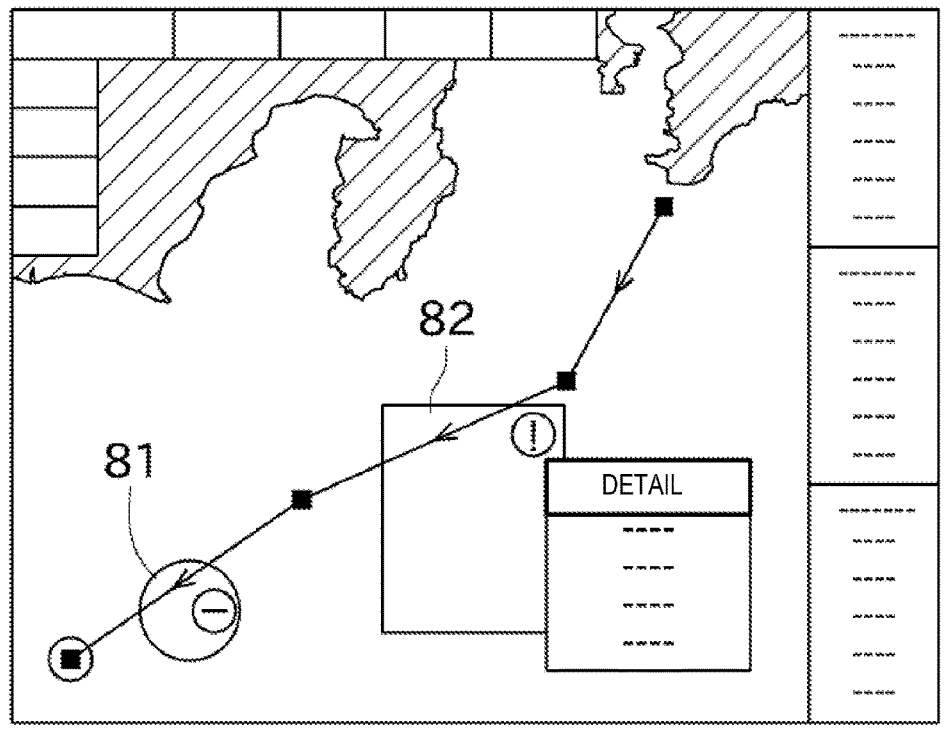
FIGS. 6A and 6B are views showing display screens when details of the caution information indicating an overlap with the route is displayed.
Figure 6B:
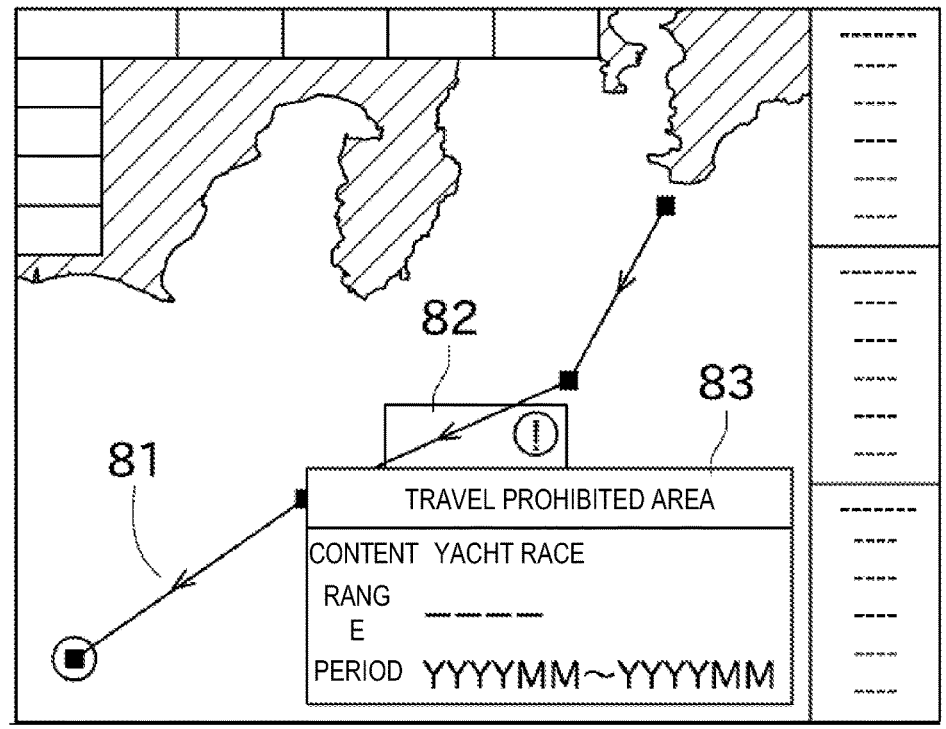

In addition, in this embodiment, by selecting a range which the caution information indicates (e.g., the prohibited area 81 or the caution area 82) and further selecting (touching or clicking) the item "DETAIL" (see FIG. 6A), a caution information display box 83 displaying detailed information of the caution information is displayed (see FIG. 6B). With this configuration, the period which is relevant to the caution information can easily be learnt, and therefore, the travel time and date can easily be set while avoiding the relevant period. Moreover, even when the level is "TRAVEL CAUTION," it can easily be confirmed that it is irrelevant to the travel of the ship. For example, when the purpose of the travel is to move, even if the route and a no-fishing area are overlapped with each other, no problem occurs.

As described above, the navigation apparatus 1 includes the display 21, the user interface 23, the caution information reader 32, and the route verifier 33. The display 21 displays on the chart, the user-scheduled route. The user interface 23 accepts the input of the travel time and date on the route. The caution information reader 32 reads the caution information based on the travel time and date inputted through the user interface 23. The route verifier 33 at least extracts the caution information on or near the one or more positions on the route, based on one or more positions indicated at which the caution information read by the caution information reader 32 indicates, and one or more positions on the route. Then the route verifier 33 verifies the route based on the extracted caution information.

Figure 8:
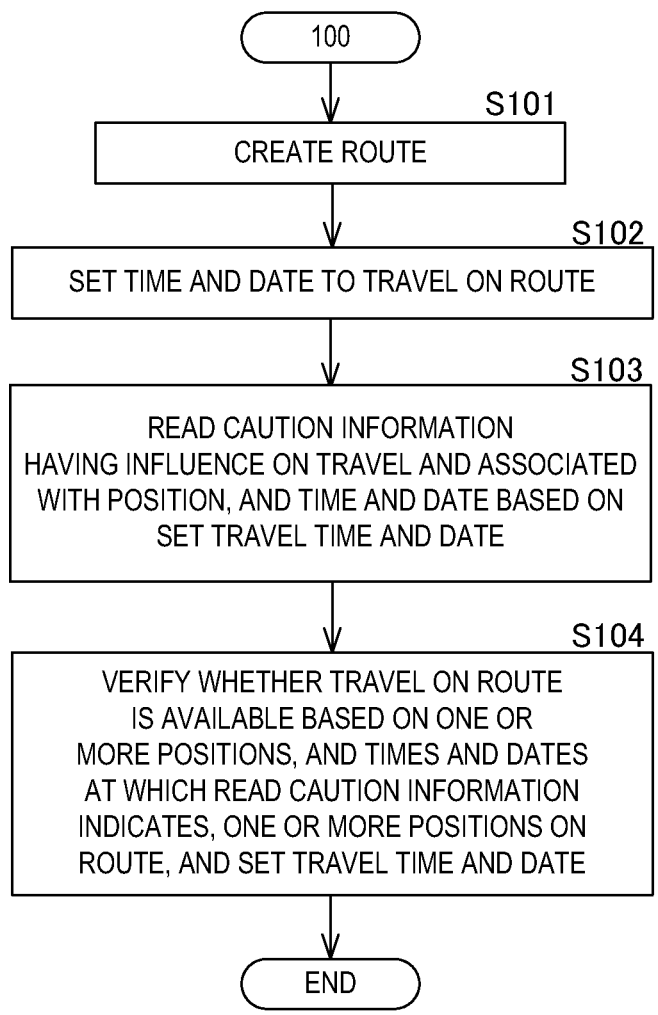
FIG. 8 is a flowchart showing a method of planning and verifying a route according to the present invention.

Therefore, a method of planning and verifying a route by using the navigation apparatus 1 is as follows. With reference also to the flowchart shown in FIG. 8, the method (100) includes creating a route according to an instruction from a user (S101), setting time and date to travel on the route according to an instruction from the user (S102), and reading caution information having influence on the travel and associated with position, and time and date (S103). The method also includes verifying whether the travel on the route is available based on one or more positions, and times and dates at which the read caution information indicates, one or more positions on the route, and the set travel time and date (S104).

In the method, the reading caution information may include reading the caution information having influence on the travel, based on the set travel time and date, the caution information being associated with position, and time and date. In the method, the verifying whether the travel on the route is available may include verifying whether the travel on the route is available based on the travel time and date on at least the caution information on or near the one or more positions on the route among the read caution information read.

In this manner, the user can grasp the details of the caution information existing on the route on the inputted time and date. Therefore, a new route to travel can easily be planed, for example. Additionally, even when it is confirmed that the scheduled route cannot be traveled, unlike the conventional configuration, the travel time and date can easily be changed with the configuration described above, and therefore, it can easily be grasped whether the route after the change of the travel time and date can be traveled even before actually changing the travel time and date.

As above, the suitable embodiment and the modifications of the present invention are described. The above configuration may be modified as follows.

Figure 7A:
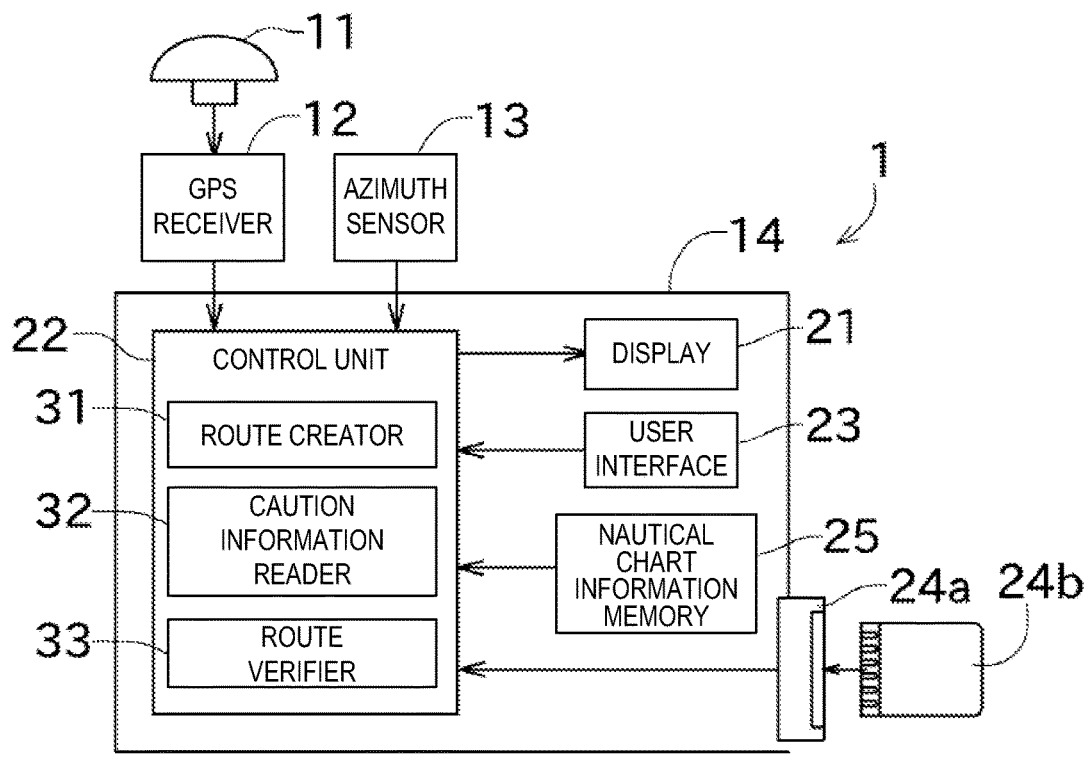
FIGS. 7A and 7B are block diagrams showing modifications of the navigation apparatus.

The caution information memory 24 (memory) is not limited to the hard disk drive, and may be, as shown in FIG. 7A, a reader 24a that can read a memory card 24b which serves as a memory media. Additionally, the memory media is not limited to the memory card, and may be a CD, a DVD, etc.

Figure 7B:
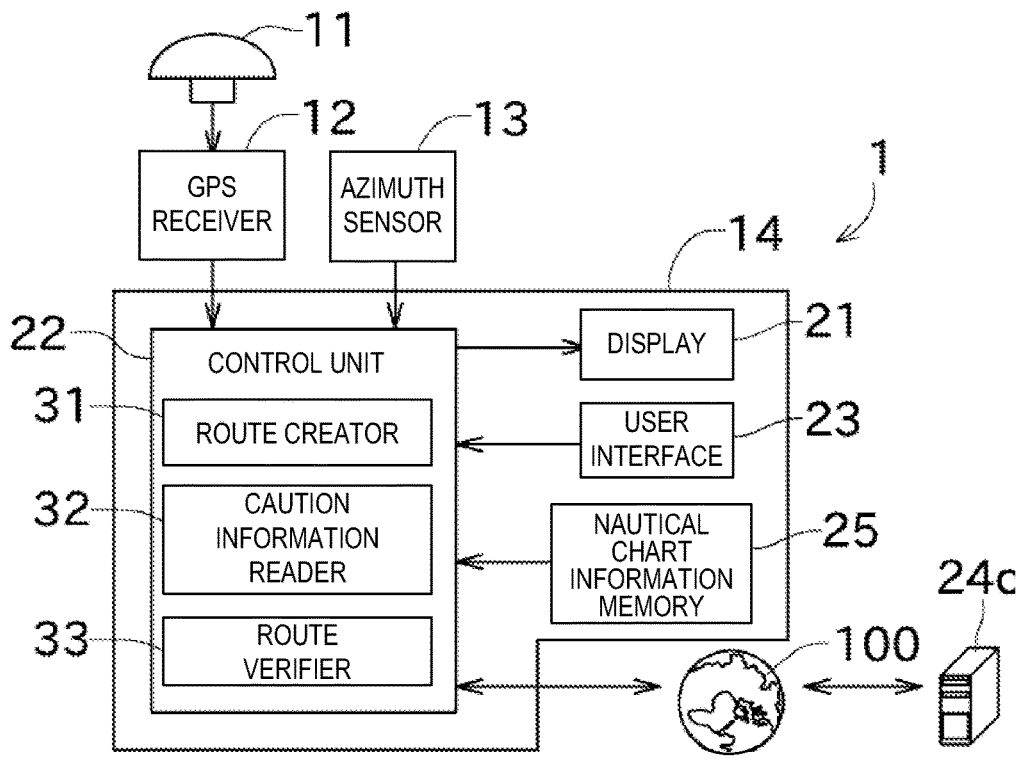

The caution information reader 32 is not limited to the configuration of reading the caution information from the memory which is locally connected. For example, when the ship can use internet via, for example, satellite communication, it may be configured such that the caution information is read out from a server 24c via internet 100, as shown in FIG. 7B.

The method of specifying the travel time and date is arbitrary and not limited to the above configuration. Additionally, the caution information described above is merely an example, and may include frozen water, etc. Moreover, AIO (Admiralty Information Overlay) can be used as the caution information. In the AIO, latest information which is not reflected on the electronic nautical chart, or alternatively, temporal, preliminary, and additional information is described in association with position and time. Specifically, when the navigation apparatus 1 verifies the created route, it determines whether the information in the AIO on/near the route exists, and when the information in the AIO exists on/near the route, the information is displayed on the display 21 similarly to the above embodiment.

In the above embodiment, the caution information has two kinds in the "LEVEL"; however, it may be one kind, three kinds, or more. In the case with three or more kinds, the displaying form thereof may be changed according to the level, similar to the above embodiment.

The route verifier 33 may be displayed on an external display screen, or may be informed to the user by sound, light, etc.

The movable body in which the route planning apparatus is equipped is not limited to ships, and may be airplanes, automobiles, etc.

In the foregoing specification, specific embodiments of the present invention have been described. However, one of ordinary skill in the technique appreciates that various modifications and changes can be performed without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A marine route planning apparatus, comprising:
   a display, associated with a computing device that displays a user-scheduled route on a map, the user-scheduled route including one or more geographic route positions;
   a user interface, displayed on the display associated with the computing device, that accepts an input of the user-scheduled route, and a time point for each geographic route position on the user-scheduled route, so that each of the one or more geographic route positions is associated with a time point;
   memory of the computing device that stores sets of maritime caution information, each set of maritime caution information being associated with at least an associated effective maritime caution geographic range, effective maritime caution time period, and maritime caution level; and
   a processor executing a route verifier that is configured to selectively extract relevant maritime caution information, the relevant maritime caution information being sets of maritime caution information associated with effective maritime caution geographic ranges and effective maritime caution time periods that overlap given time points for given geographic route positions on the user-scheduled route;
   wherein the display is configured to display the extracted relevant maritime caution information, including the maritime caution level associated with the set of maritime caution information,
   wherein the maritime caution level comprises one of three or more levels of importance, including at least one level indicating no maritime caution information;
   wherein the maritime caution information is selected from the group consisting of maritime caution information on a no-fishing zone, maritime caution information on a travel prohibited area associated with a specific purpose of travel, maritime caution information on shallow water, and maritime caution information on a yacht race; and
   wherein the marine route planning apparatus is configured to be installed on a ship.

2. The apparatus of claim 1,
   wherein the user-specified route includes a specific purpose of travel;
   wherein the caution information includes data indicating a kind of caution; and
   wherein the route verifier verifies whether the caution information is relevant to the user-scheduled route further based on a comparison of the specific purpose of travel and the kind of caution of the caution information.

3. The apparatus of claim 1, wherein the user interface accepts inputs of a travel starting time and date and a travel ending time and date on the route.

4. The apparatus of claim 1, wherein the user interface accepts an input of a travel time and date for at least a partial range of the route formed by dividing the route.

5. The apparatus of claim 1, wherein the route verifier verifies that the user-scheduled route is not available when the caution information contains information on a travel prohibited area and the user-scheduled route includes a geographic route position within the travel prohibited area.

6. The apparatus of claim 1, wherein the caution information reader reads the caution information via the Internet.

7. The apparatus of claim 1, wherein the caution information is displayed on the route.

8. The apparatus of claim 7, wherein the display displays the user-scheduled route by changing a displaying form of the user-scheduled route according to the caution information.

9. The apparatus of claim 1, wherein the route is formed by connecting a plurality of waypoints with each other that are specified by a user.

10. The apparatus of claim 9, wherein the user interface accepts input of time and date information for travel for each of the waypoints.

11. The apparatus of claim 1, being equipped in a ship.

12. A method of planning and verifying a marine route, comprising:
   receiving user input of a user-specified route, and a time point for each geographic route position on the user-scheduled route via a user interface displayed on a display associated with a computing device, so that each of the one or more geographic route positions is associated with a time point;

in a memory of the computing device, storing sets of maritime caution information, each set of maritime caution information being associated with at least an associated effective maritime caution geographic range, effective maritime caution time period, and maritime caution level;

selectively extracting relevant maritime caution information, the relevant maritime caution information being sets of maritime caution information associated with effective maritime caution geographic ranges and effective maritime caution time periods that overlap given time points for given geographic route positions on the user-scheduled route; and displaying on the display the extracted relevant maritime caution information, including the maritime caution level associated with the set of maritime caution information, wherein the maritime caution level comprises one of three or more levels of importance, including at least one level indicating no maritime caution information;

the maritime caution information is selected from the group consisting of maritime caution information on a no-fishing zone, maritime caution information on a travel prohibited area associated with a specific purpose of travel, maritime caution information on shallow water, and maritime caution information on a yacht race; and the computing device is configured to be installed on a ship.

13. The apparatus of claim 1,
wherein the user-specified route includes user-specified waypoints; and
wherein the route verifier verifies whether the caution information is relevant to the user-scheduled route further based on a proximity of the caution geographic range to user-specified waypoints.

14. The method of claim 12,
wherein the user-specified route includes user-specified waypoints; and
wherein the step of verifying is further based on a proximity of the caution geographic range to user-specified waypoints.

15. The apparatus of claim 2, wherein the caution information contains information on at least one of a no-fishing zone and a travel prohibited area associated with the specific purpose of travel.

16. The method of claim 12,
wherein the user-specified route includes a specific purpose of travel;
wherein the caution information includes data indicating a kind of caution; and
wherein the step of verifying is further based on a comparison of the specific purpose of travel and the kind of caution of the caution information.

\* \* \* \* \*